UNITED STATES PATENT OFFICE.

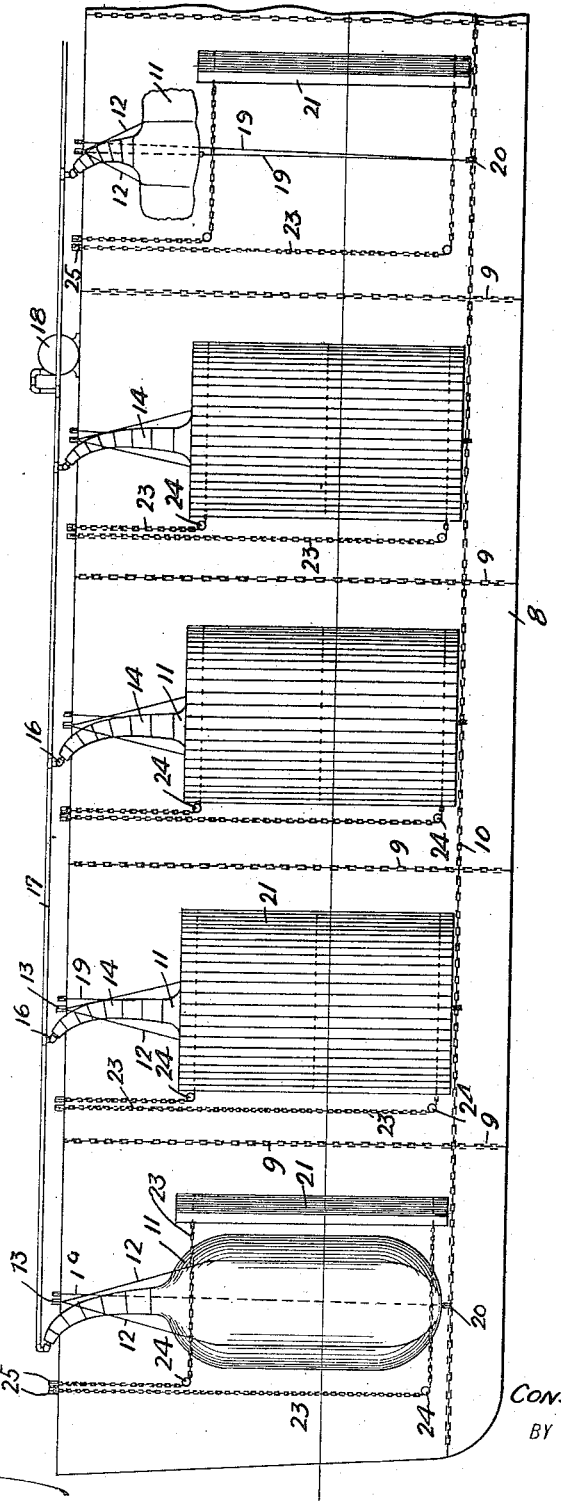

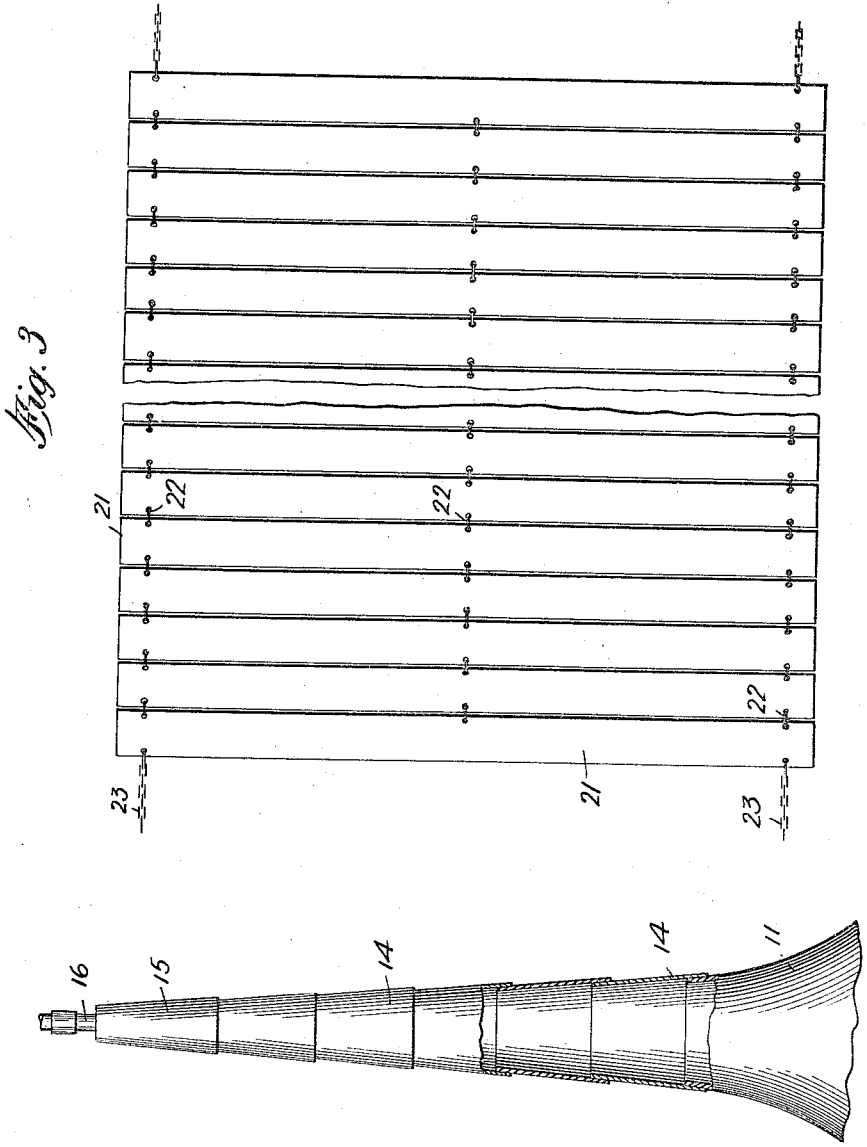

CONSTANTINE M. BUZUK, OF NEW YORK, N. Y.

FLOTATION-BELT FOR VESSELS.

1,124,208. Specification of Letters Patent. Patented Jan. 5, 1915.

Application filed June 11, 1914. Serial No. 844,471.

*To all whom it may concern:*

Be it known that I, CONSTANTINE M. BUZUK, a subject of the Czar of Russia, and a resident of the city of New York, borough of Brooklyn, in the county of Kings and State of New York, have invented a new and Improved Flotation-Belt for Vessels, of which the following is a full, clear, and exact description.

Among the principal objects of my invention are the following: to provide auxiliary members adapted for disposition in service relation to be inflated; to provide flotation displacement at the outside of the hull of a vessel; to provide means for protecting the flotation members in service relation from damage due to abrasion or shock; to provide means for rapidly and readily covering the flotation members; to provide floating means with armor to prevent injury thereto; and to provide means whereby the flotation capacity of a vessel may be augmented at will.

*Drawings.*—Figure 1 is a side view of the forward portion of a vessel equipped with a flotation belt, constructed and arranged in accordance with the present invention. Fig. 2 is a detail view partly in section, of the telescopic end or neck of a flotation member, constructed and arranged in accordance with the present invention; and Fig. 3 is a detail view, showing an arrangement of the armor, with which the flotation members are provided.

*Description.*—As shown best in Fig. 1 of the drawings, the hull 8 is provided with a harness, comprising a series of transversely circling chains 9 and a lengthwise enveloping guide chain 10. The chains 9 are anchored on the gunwales or rail of the vessel at each side and are passed completely under and about the hull of the vessel by the anchorage of the chains to the gunwales of the vessel. The spaced relation of the said chains at this point is fixed. Below the water and adjacent the keel of the hull 8, the chain 10 is anchored or attached to the chains 9. This attachment provides for the spaced relation of the chains 9 below the water in which the hull 8 is floated. It is above the guide chain 10 that what is herein termed the flotation belt for the vessel, is disposed.

The flotation belt is primarily composed of a series of inflation members 11. The members 11 are constructed of any suitable flexible material, and of material which is impervious to water, such as a good quality of rubber-coated cloth. If found necessary, the cloth of which the members 11 are composed can be reinforced by a wire mesh. It is preferred, however, that the reinforcement with which the material is provided, will be such as to permit the collapsing or folding of the members 11 to the contracted size and shape, such as shown at the right-hand end of Fig. 1 of the drawings. To fold the members 11 in the manner above noted, each member is provided with a series of runner cables 12. The cables 12 pass over pulleys 13, mounted on the ship's gunwale and from thence are carried to any suitable form of winch, or other hoisting or cable-gathering device. It is not found necessary to hold the upper end of the members 11, gravity serving to this end. When the body of each member 11 is contracted by being drawn upward through the agency of the cables 12, the necks of the various members are telescoped, as shown in the illustration of the member 11 at the right-hand end of Fig. 1, to which reference has been above made. To this end the necks are composed, as seen best in Fig. 2 of the drawings, of a series of telescopically arranged tapered sections 14. These sections are preferably constructed from a suitable material, such as aluminum. The end section 15 is capped and provided with a pipe nipple 16, and the nipple 16 on each of the sections 15, is suitably coupled with a distributing pipe 17. The pipe 17 is suitably connected with an air tank 18. The pipe 17 is disposed in convenient position and the connections with the various members 11 are as numerous as deemed necessary for the successful operation of the apparatus. Each of the members 11 are drawn downward into service position by cables 19. The cables 19 are connected with any suitable operating apparatus, such as for instance, a winch, to which the cables 12 may be connected. The connection should be such that when the cables 19 are drawn in, the cables 12 would be run out and when the cables 12 are drawn in, the cables 19 would be run out. The cables 19 are passed under the pulleys 20, which are mounted on the side of the hull below the service position of the members 11.

The normal position of the members 11 and of the protective armor therefor, is that shown at the right-hand end of Fig. 1 of the drawings. The service position of the said members and of the armor provided therefor, is that shown in Fig. 1 of the drawings, at the three middle sections thereof. The armor referred to, consists primarily of a number of vertical slats 21. The slats 21 are constructed from light steel of any suitable thickness and quality. They are preferably connected by loops 22. As seen in Fig. 1 of the drawings, the normal position of the slats 21 is the nested position, shown at the extreme ends of the said figure. From this normal position, the slats are drawn to the spread position, shown at the center of said figure of the drawings. The rear ends of the combined slats are anchored to the hull of the vessel in any suitable manner, while the forward ends of the combined slats are attached to the chains
23. The chains 23 are passed around the pulleys 24 and over the pulleys 25, suitably disposed on the gunwale of the vessel. The chains are drawn upon by any suitable mechanism, such as a winch or hoisting engine.

When a vessel is equipped with a belt such as described, the operation is as follows: Should an accident, endangering the vessel, occur, the members 11 are immediately lowered by drawing upon the cables 19, thereby pulling the members to the service position of each. Prior to inflating the members 11, the chains 23 are drawn upon to spread the slats 21, constituting the various armor shields for the members, until the same are outspread in covering relation to the said members. The air held in the tank 18, is now permitted to pass into the pipe 17, to be thereby distributed to the various members 11, which on becoming inflated, expand outward against the slats 21, to be thereafter held and protected thereby against the buffeting of the waves of the sea, in which the vessel is floating, or from contact with floating ice of other debris. The displacement capacity of the aggregated members 11, is such as to maintain or augment the flotation of the vessel.

If the invention is applied to ships of war, then the flotation belt is prepared in the manner above described, prior to the ship going into action. When thus arranged, the slats 21 forming the armor for the members 11, are sufficient to deflect shot from small fire arms, to provent or avoid puncturing the members 11. Such a belt would prove quite effective when applied to a vessel entering an armored harbor.

Claims:

1. A flotation belt for vessels, comprising a plurality of inflation members; a harness for said members disposed at the outside of a vessel and anchored thereto; means mounted on said harness for drawing said members to service position; means operable to collapse and lift said members out of service position; and a plurality of telescopic necks, one for each of said members extensible for permitting the inflated members to assume a lowered or service position.

2. A flotation belt for vessels, comprising a plurality of independently inflatable members; means for lowering said members to service position; a plurality of protective coverings for said members, said coverings being each provided with a series of metal slats pivotally connected; means operable from the deck of said vessels for disposing said protective coverings in service relation; and means carried by said vessels for inflating said members.

In witness whereof I have signed my name to this specification in the presence of two subscribing witnesses.

CONSTANTINE M. BUZUK.

Witnesses:
E. F. MURDOCK,
PHILIP D. ROLLHAUS.